Figure 1:
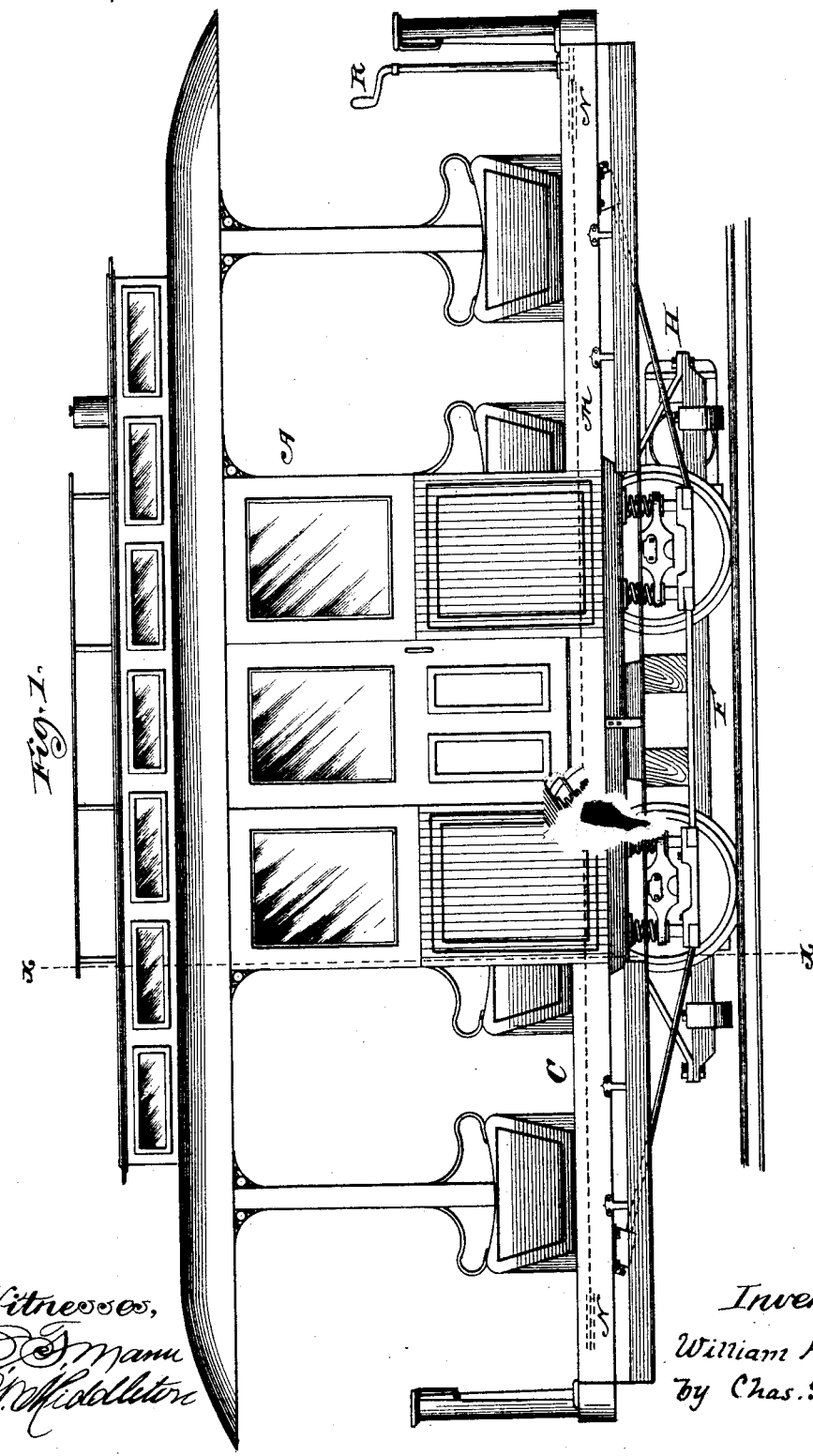

(No Model.) 4 Sheets—Sheet 1.

W. H. PATTON.
ELECTRIC MOTOR CAR.

No. 475,702. Patented May 24, 1892.

Witnesses,

Inventor,
William H. Patton
by Chas. G. Page
Atty.

(No Model.) 4 Sheets—Sheet 2.
W. H. PATTON.
ELECTRIC MOTOR CAR.
No. 475,702. Patented May 24, 1892.
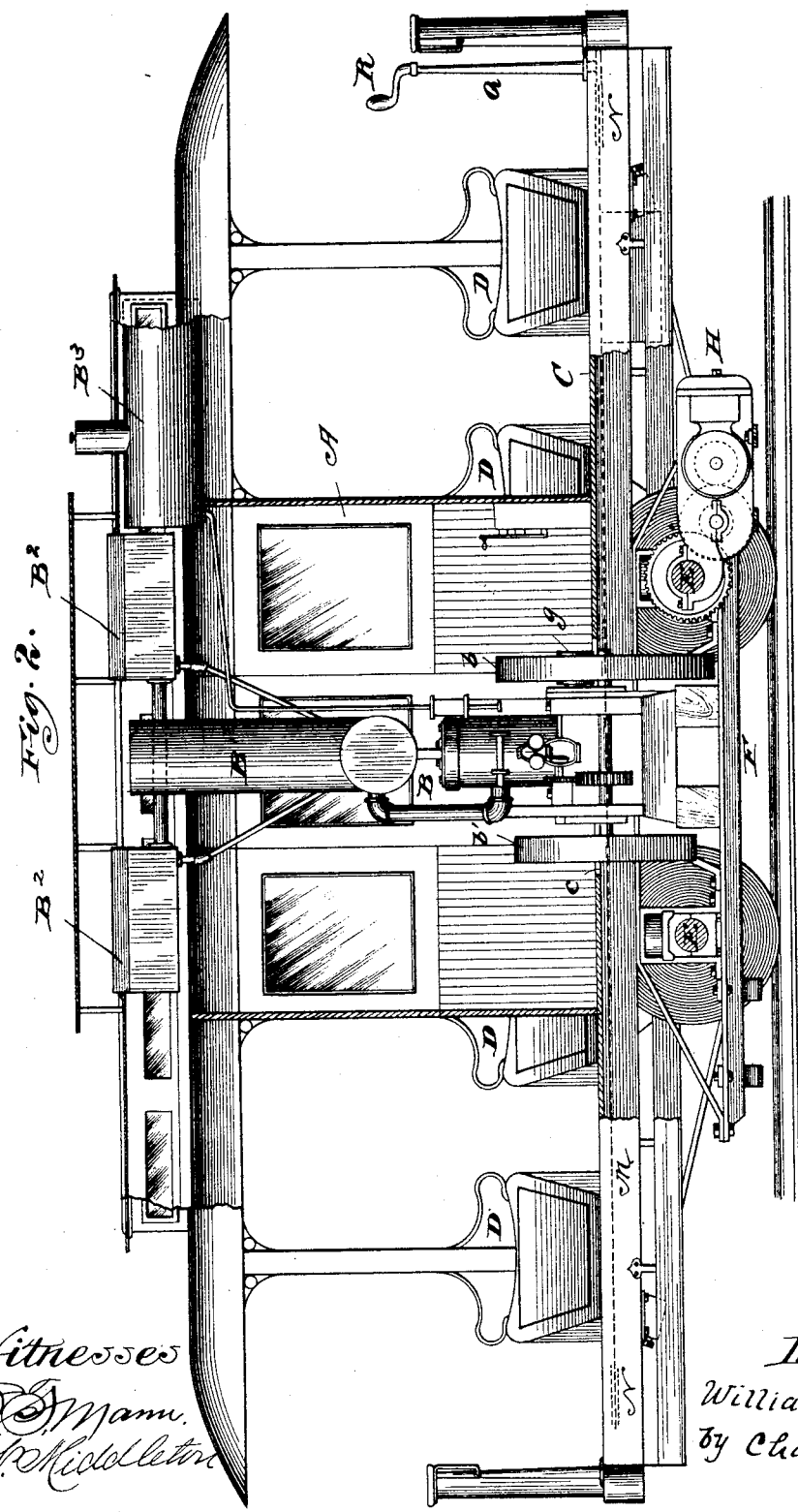
Witnesses
Inventor,
William H. Patton
by Chas. G. Page
Atty.

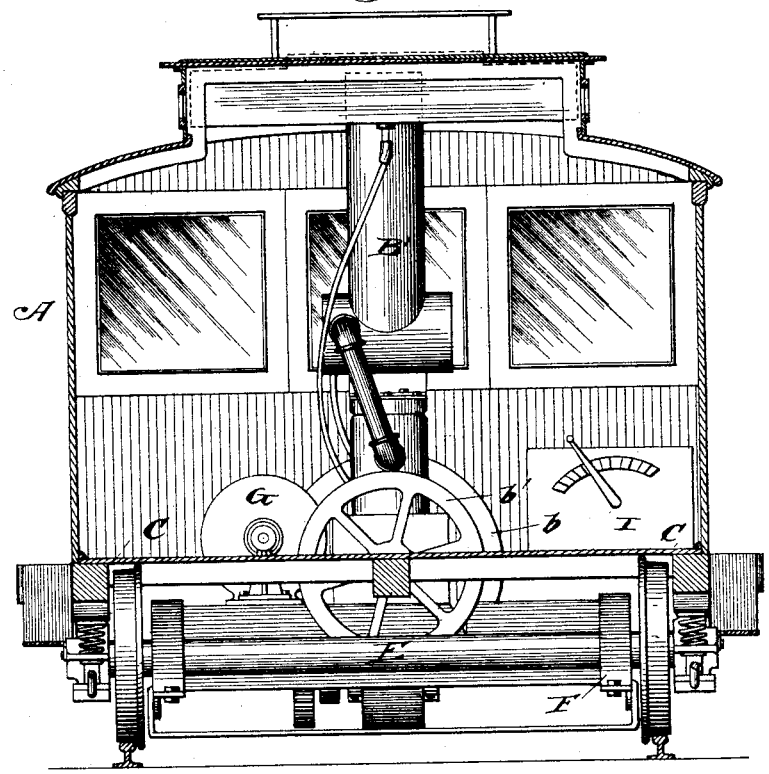

(No Model.) 4 Sheets—Sheet 4.
W. H. PATTON.
ELECTRIC MOTOR CAR.
No. 475,702. Patented May 24, 1892.
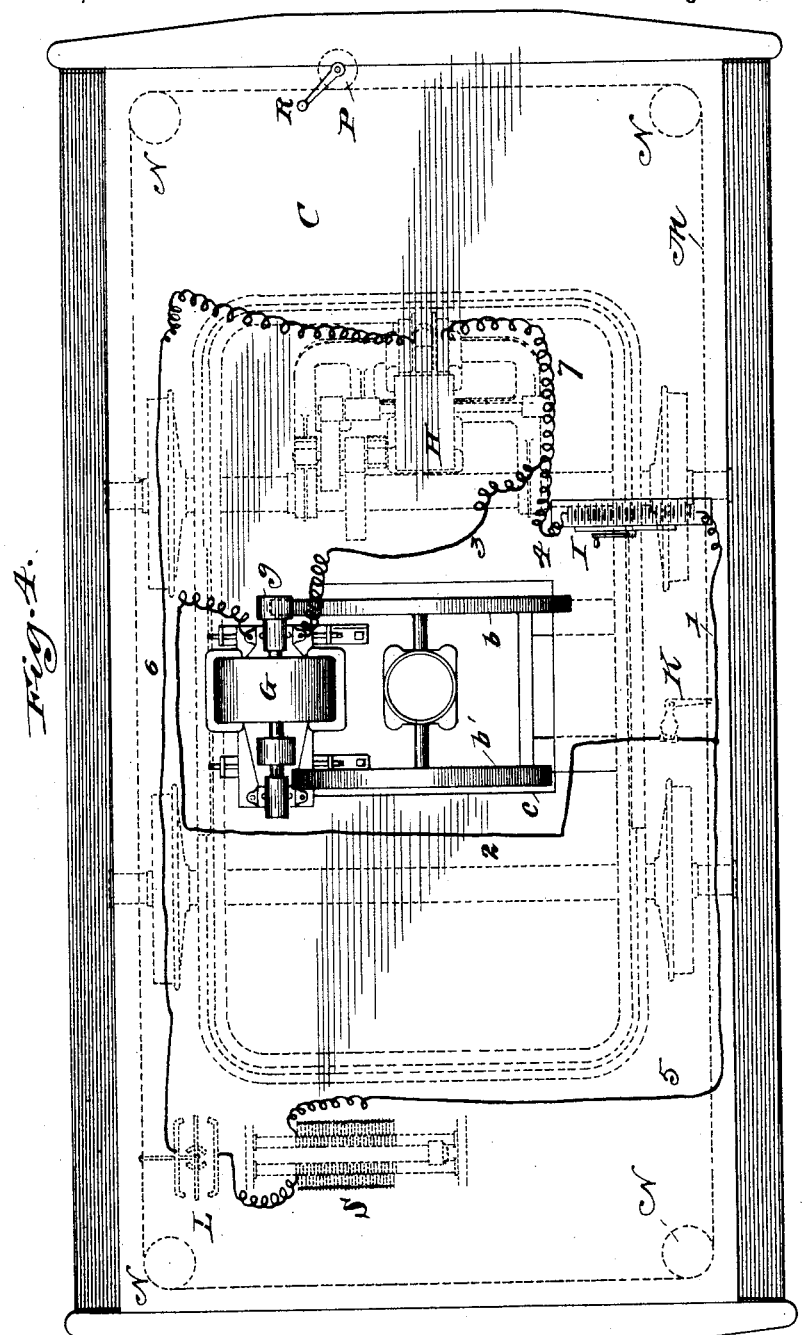
Witnesses,
S. F. Mann
W. Middleton
Inventor,
William H. Patton
By Chas. G. Page
Atty.

UNITED STATES PATENT OFFICE.

WILLIAM H. PATTON, OF CHICAGO, ILLINOIS, ASSIGNOR TO THE PATTON MOTOR COMPANY, OF PUEBLO, COLORADO.

ELECTRIC-MOTOR CAR.

SPECIFICATION forming part of Letters Patent No. 475,702, dated May 24, 1892.

Application filed September 7, 1891. Serial No. 404,952. (No model.)

*To all whom it may concern:*

Be it known that I, WILLIAM H. PATTON, a citizen of the United States, residing at Chicago, in the county of Cook and State of Illinois, have invented a certain new and useful Improvement in Motors for Street-Cars, of which the following is a specification.

My invention relates to means for propelling cars for street-railway and analogous service; and it consists, essentially, in providing a car or truck with a suitable engine or motor as a primary source of power, a dynamo-electric machine operated by the said engine or motor, an electric motor supplied from the dynamo and employed for operating the running-gear of the car or truck, and a storage-battery in multiple circuit with the dynamo and electric motor, so as to derive its supply from the dynamo and stand in readiness for supplying the motor at times when its service is needed.

The electric motor can be connected with the running-gear or wheels of the car in any suitable way, and the storage-battery can be connected with the dynamo and electric motor through the medium of any suitably-arranged multiple circuit permitting the dynamo to supply the storage-battery and allowing the storage-battery to supply the electric motor, and thus arranged the storage-battery affords a ready and efficient means for the economical and advantageous conservation and utilization of surplus electric energy as a source of supply which is in constant readiness for automatically supplying the electric motor at such times as the service of such supply may be needed. Where, for example, the car is running along a downgrade and less work is required on the part of the dynamo as a means for operating the electric motor, the surplus electrical energy developed by the dynamo will be stored up in the storage-battery and there held in readiness as a source of supply auxiliary to the dynamo should the voltage of the latter drop to the voltage of the storage-battery by reason of the opposition to the movement of the car along a curve or upgrade or when starting, and in this way I can economically and conveniently store up power from the dynamo, and then use such power at times when it is needed as an adjunct to the dynamo in supplying the electric motor. This conservation or storing up of extra or surplus energy can also be attained when, for example, the car is running along a perfectly level easy track, or running along a comparatively easy track with a light load, it being apparent that under such circumstances the dynamo can be economically driven, so as to supply the electric motor in accordance with the requirements of the latter, and also supply the storage-battery so as to provide therein a supply ready for demands upon its service. The engine or motor which serves to drive the dynamo can also be permitted to run continuously during the trip or any desired period of service on the part of the car, and hence during the stops made by the car the electrical energy developed in the dynamo can be economically utilized to supply the storage-battery, wherein it will be held in readiness for active service.

In addition to the provision of a simple, practical, and efficient mode or system of propulsion insuring the steady running of the car and involving the economical generation and utilization on a car of electrical energy sufficient to meet all demands I also render it practical to operate the dynamo by a comparatively small gas-engine or gas-motor, for which fuel-supply in compact form can be conveniently carried by the car, and while my invention is not limited to the employment of a gas-engine or gas-motor the use of a motor of such class is preferable. A further advantage herein involved is that I render it practical, economical, and advantageous to use an electric motor upon a car as a means for directly operating the running-gear of the car without either overhead or underground wire service.

As hereinbefore stated, the use of a gas-engine as a means for operating the dynamo is desirable, since its fuel-supply in the form of gasoline, for example, can be carried in exceedingly compact form, and for the further reason that when once started it can be permitted to run continuously without special attention. To start up the gas-engine, however, involves time, labor, and trouble. Thus the gas-engine is provided with one or more comparatively heavy balance-wheels, so as to insure its steady running when once started, and to turn the balance-wheel by hand until a start of the engine is attained is tiresome and inconvenient and involves the labor of overcoming the inertia of the engine and dynamo and operating the engine until it will run of its own accord. The position in which I find it desirable to place the engine also renders it a matter of extreme inconvenience and difficulty for an attendant to take hold of one of its balance-wheels and operate the same for the purpose of starting up the engine. To the attainment of various practical and serviceable ends I prefer to arrange the gas-engine upon a frame which is supported upon the car-axle below the floor or platform of the car, substantially as in Letters Patent of the United States No. 434,993, issued to me as assignor to the Patton Motor Company, and set the gas-engine as low down as possible, in which way the supply-reservoir and water-tanks can be placed at a suitable height above the engine, room provided for the muffler, the objectionable feature of top-heaviness avoided, and greater steadiness in the general running of the car be insured than could be attained by setting the engine comparatively high up. While, therefore, it is desirable to set the gas-engine comparatively low down, such arrangement will necessarily so lower the balance-wheel relatively to the car floor or platform as to render it nearly impractical for an attendant to stoop down and take hold of the balance-wheel for the purpose of starting up the engine.

A further object of my invention is to overcome all of such defects and disadvantages, and to such end I utilize the dynamo as a motor for starting up and running the gas or analogous engine or motor until the speed of the engine is such as to drive the dynamo at a rate of speed sufficient to convert it into a generator. The dynamo is thus primarily supplied from a storage-battery, and as a convenient, economical, and effective arrangement I supply the dynamo from a storage-battery which in running the car is employed as an auxiliary and adjunct to the dynamo, as hereinbefore set forth. When, therefore, the dynamo and electric-motor circuits are open and the engine is at rest, the dynamo can be started up as a motor by placing the storage-battery in circuit connection with the dynamo, whereupon the dynamo will at once run as a motor and start up the engine. As soon, however, as the engine attains a proper rate of speed it will so increase the speed of the dynamo as to convert the same into a generator, whereupon the dynamo will supply back the storage-battery, and the two will be in readiness for supplying the electric motor.

In the accompanying drawings, Figure 1 represents in side elevation a motor-car embodying my invention. Fig. 2 represents the motor-car partly in side elevation and partly in vertical longitudinal section. Fig. 3 is a transverse section on line $x\,x$ in Fig. 1. Fig. 4 is a top plan view of the floor or platform of the car and illustrates the dynamo and motor circuits.

The car herein illustrated is provided with a centrally-arranged cab or room A, which affords space for the portion of a gas-engine B which extends above the floor or platform C of the body of the car. The cab or engine-room being centrally located permits the arrangement of seats D upon the forward and rear portions of the car floor or platform and also permits the arrangement of the gas-engine at a point midway of the space between the front and rear axles E, and thereby tends to insure proper balance and steady running.

The car-body is suitably supported upon the axles, and upon the latter I also support independently of the car-body a frame F, which is arranged between the wheels and set as far below the platform of the car as practicable.

The gas-engine is supported upon the frame F, which is provided with a suitable cross-support for the same, and the floor or platform of the body of the car is provided with a centrally-arranged opening $c$, through which the gas-engine is arranged to rise. The portion of the gas-engine which is within the cab A stands centrally within the same and is desirably arranged, so that its balance-wheels $b\,b'$ shall be in planes at right angles to the length of the car, in which way the dynamo can be conveniently arranged between the gas-engine and one side of the car, and thereby leave room within the cab at the opposite sides of the gas-engine for an attendant without so exceeding the length of the cab or room A toward the ends of the car as to encroach upon the spaces allotted to the front and rear seats. By thus arranging the gas-engine as low down as possible space is also provided for the muffler B', and, moreover, water-tanks $B^2$ for cooling purposes and a supply-tank $B^3$ (containing, for example, a supply of gasoline) can be properly arranged at a desirable height above the engine.

The dynamo G and electric motor H are both desirably supported upon the frame F, and as a special and preferred arrangement the dynamo is driven from the gas-engine by friction-gearing, to which end the armature-shaft of the dynamo is provided with a friction wheel or pulley $g$, which engages with the balance-wheel $b$ of the gas-engine. By thus connecting the dynamo with the gas-engine the two can be arranged close together and a steady and reliable driving connection insured.

The storage-battery I can be arranged either upon the frame F or upon the car-floor or other portion of the car; but as a convenient arrangement it is shown upon the car-floor at a point within the cab, so as to be readily accessible to an attendant.

The dynamo, storage-battery, and electric motor are in multiple circuit, so as to permit the dynamo to supply both the electric motor and the storage-battery, and also permit the storage-battery to supply the electric motor as an auxiliary and adjunct to the dynamo, and the electric motor is applied for operating the running-gear of the car, so as to propel the same. The electric motor serves, therefore, to operate the wheels or running-gear of the car through the medium of any suitable driving connection, and hence serves to convert the energy of the electric currents from the dynamo, and from the storage-battery as an auxiliary to the dynamo when such auxiliary supply becomes necessary, into the energy of mechanical motion, which is utilized as a power for directly operating the running-gear of the car through such gearing or power-transmitting connection as may be selected or provided to connect the running-gear of the car with the electric motor.

The gas-engine or other primary motive power employed, the dynamo, the storage-battery, and the electric motor may for the purpose of supplying the electric motor, as hereinbefore set forth, be arranged on the car as shown, or they may be in any other suitable arrangement so long as the principle of operation involved in my invention is therein embodied, and the storage-battery, dynamo, and electric motor can be connected by any suitable multiple or equivalent circuit permitting the storage-battery to derive its supply from the dynamo and supply the motor as an auxiliary and adjunct to the dynamo for the purpose hereinbefore set forth. By using a dynamo, storage-battery, and electric motor in connection with the gas-engine or other motive power the gas-engine or motive power may be run at a high speed and continuously, and the surplus electrical energy developed by the dynamo, particularly during stops of the car and other occasions hereinbefore described, will be stored up in the storage-battery, and thereby rendered available for use whenever its service is needed. The dynamo can also be run at a high rate of speed by the gas-engine or motive power, and the electricity generated can be used as required by the electric motor, which, as hereinbefore set forth, can be supplied from the storage-battery as well as from the dynamo, and hence the speed of the gas-engine or other motive power can be regulated to suit its requirement without regard to the speed required for the driving-gear of the car—that is to say, the gas-engine or gas-motor can be operated with reference to the action of the dynamo as a source both directly for supplying the electric motor and for charging the storage-battery as an auxiliary source of supply for the electric motor.

The gas-engine or motive power can run continuously without loss of power in stopping and starting, as the electricity generated by the dynamo while the car is not moving and all electricity in excess of that required to run the electric motor when the car is moving under ordinary conditions or circumstances hereinbefore set forth is stored in the storage-battery.

By using a dynamo and electric motor the gearing of the car is driven at any desired speed without regard to the speed of the engine or motive power, and by using a storage-battery in connection with the dynamo and electric motor the electricity in excess of that used by the motor is stored, thus not only preventing a waste of power in starting and stopping the engine or motive power, but providing a powerful current of electricity to be used when the car is started, as is necessary from the fact that more power is required to start a car or train than is required after the train is in motion. The dynamo, storage-battery, and electric motor are also in multiple or equivalent circuit arranged to permit the dynamo to supply both the electric motor and the storage-battery and also permit the storage-battery not only to supply the electric motor in accordance with requirements, as aforesaid, but also temporarily supply the dynamo, so as to temporarily run the latter as a motor for the purpose of starting up the gas-engine or equivalent primary power.

In Fig. 4 I have illustrated the dynamo, electric motor, and storage-battery in multiple circuit arranged so as to permit the dynamo to supply both the storage-battery and electric motor and also permit the storage-battery not only to supply the electric motor but also supply the dynamo when it is desired to run the same as a motor for the purpose of starting up the engine.

Let it first be assumed that the engine is at rest and that switches K and L (indicated in dotted lines and respectively in the dynamo and electric-motor circuits) are open. If now switch K in the dynamo-circuit be closed, the storage-battery (assumed to have been previously charged from the dynamo) will supply the dynamo, since the latter will have been placed in closed circuit with the storage-battery through connections 1 2 3 4. The dynamo will thereupon run as a motor and start up the engine, which latter upon attaining suitable speed will in turn run the dynamo at a rate of speed to convert the dynamo into a generator, and thus supply back the storage-battery. When it is desired to start the car, the attendant will close switch L in the motor-circuit, whereupon the electric motor will be placed in closed circuit with the dynamo through the medium of connections 2 5 6 7 3, and also be placed in closed circuit with the storage-battery through connections 1 5 6 7 4. When, therefore, the switches are thus closed, the electric motor can be supplied by the dynamo and storage-battery, according to requirements, and, also, where there is an excess of power generated by the dynamo the same will be supplied to and stored up within the storage-battery. During a trip of the car, the gas-engine can run continuously, and hence excess of power over and above that required for operating the electric motor can be supplied from the dynamo to the storage-battery, it being understood that when switch L is opened for the purpose of opening the motor-circuit and stopping the car the dynamo-circuit, which includes the storage-battery, can be left closed, so as to utilize the dynamo during the stop of the car as a means for charging the storage-battery.

As a means for operating the switches, I have indicated in dotted lines a chain or cable M, arranged to pass about rolls N on the platform and connected with the switches. This chain or cable can be controlled by a winding drum or pulley P on a rotary shaft Q, which can in turn be operated by a crank-lever R at one end of the car, it being observed that in practice I also employ like means for a similar purpose at the opposite end of the car, in which way a drum or pulley can be operated by an attendant at the forward end of the car in accordance with the direction in which the car is to run. I have also indicated in dotted lines at S a rheostat arranged in the motor-circuit; but neither the rheostat nor the switches need be herein described in detail, since any known or suitable construction can be employed.

With regard to the dynamo it is only necessary to observe that it should be of the kind which can be run as a motor without reversing the direction in which it is to run as a generator. The electric motor and storage-battery can also be of any suitable type or construction. The electric motor, which can be of any suitable type or construction, is applied for operating the running-gear of the car, and hence is connected with one of the axles by suitable power-transmitting connection.

In the system for car propulsion herein involved the dynamo can be connected with the gas-engine or primary motive power in any suitable way, since as a matter of course the general operation is not dependent upon the particular connection herein shown.

What I claim as my invention is—

1. A motor system for car propulsion, comprising a dynamo operated by a suitable engine, an electric motor, and a storage-battery in multiple circuit, so as to permit the dynamo to supply both the electric motor and the storage-battery and also permit the storage-battery to supply the electric motor as auxiliary and an adjunct to the dynamo, substantially as and for the purpose set forth.

2. A motor system for car propulsion, comprising a gas-engine or analogous primary source of power, a dynamo operated by the engine, an electric motor supplied by the dynamo, and a storage-battery supplied from the dynamo and connected therewith in circuit, so that it can be employed as a source of supply for temporarily running the dynamo as a motor, operating to start up the engine, substantially as set forth.

3. A motor system for car propulsion, comprising a dynamo, a storage-battery in circuit with the dynamo, an electric motor in circuit with both the dynamo and the storage-battery and applied for driving the running-gear of the car, a gas-engine or analogous primary driving-power for operating the dynamo, and suitable means for opening and closing the dynamo and electric-motor circuits, so that as a means for starting up the gas-engine or analogous primary driving-power the dynamo can be supplied from the storage-battery and temporarily used as a motor for operating said gas-engine or analogous primary driving-power, substantially as set forth.

4. A motor-car provided with a gas-engine or analogous motive power, a dynamo connected with and driven from a balance-wheel of said engine by friction-gearing, a storage-battery supplied from the dynamo, an electric motor supplied from the dynamo and storage-battery and applied for operating the running-gear of the car, and circuit connection permitting the dynamo to be temporarily supplied from the storage-battery and run as a motor for starting up the engine, substantially as described.

5. A motor-car comprising a centrally-arranged cab A, a gas-engine supported upon a frame below the car-platform and arranged to rise within the centrally-located cab, a dynamo arranged alongside the gas-engine and operated from the same, a storage-battery supplied by the dynamo, and an electric motor for the purpose set forth, supported on said frame and supplied from the dynamo and storage-battery, substantially as described.

WILLIAM H. PATTON.

Witnesses:
CHAS. G. PAGE,
W. MIDDLETON.